(12) United States Patent
Laakso et al.

(10) Patent No.: US 7,395,069 B2
(45) Date of Patent: Jul. 1, 2008

(54) RADIO RESOURCE MANAGEMENT IN A COMMUNICATION SYSTEM

(75) Inventors: Janne Laakso, Helsinki (FI); Harri Holma, Helsinki (FI); Mika Raitola, Masala (FI); Kari Heiska, Helsinki (FI)

(73) Assignee: Nokia Corporation, Espoo (FI)

( * ) Notice: Subject to any disclaimer, the term of this patent is extended or adjusted under 35 U.S.C. 154(b) by 23 days.

(21) Appl. No.: 10/203,767

(22) PCT Filed: Jan. 18, 2001

(86) PCT No.: PCT/EP01/00568

§ 371 (c)(1),
(2), (4) Date: Jan. 17, 2003

(87) PCT Pub. No.: WO01/62032

PCT Pub. Date: Aug. 23, 2001

(65) Prior Publication Data

US 2003/0171123 A1      Sep. 11, 2003

(30) Foreign Application Priority Data

Feb. 14, 2000   (GB) .................................. 0003369.6

(51) Int. Cl.
*H04Q 7/20*    (2006.01)
(52) U.S. Cl. ................. 455/452.1; 455/451; 455/452.2; 455/453

(58) Field of Classification Search ................. 455/450, 455/453, 452.1, 452.2, 442, 436, 45.2; 370/332, 370/333
See application file for complete search history.

(56) References Cited

U.S. PATENT DOCUMENTS

| 5,293,641 | A | * | 3/1994 | Kallin et al. ................ 455/453 |
| 5,781,861 | A | | 7/1998 | Kang et al. .................. 455/442 |
| 5,862,124 | A | | 1/1999 | Hottinen et al. ............. 370/335 |
| 6,167,240 | A | * | 12/2000 | Carlsson et al. .......... 455/67.13 |
| 6,175,734 | B1 | * | 1/2001 | Desgagne et al. ........... 455/437 |

(Continued)

FOREIGN PATENT DOCUMENTS

EP        0762668 A2    3/1997

(Continued)

OTHER PUBLICATIONS

Office Action dated Apr. 4, 2006 in corresponding Japanese Patent Application No. 2001-560164.

*Primary Examiner*—Duc M. Nguyen
*Assistant Examiner*—Dai Phuong
(74) *Attorney, Agent, or Firm*—Harrington & Smith, PC

(57) ABSTRACT

The present invention relates to a radio communication system and a method in the system. According to the method radio resources of the system are managed based on information of the bitrate that has been allocated for a station of the radio communication system.

26 Claims, 2 Drawing Sheets

U.S. PATENT DOCUMENTS

| | | | |
|---|---|---|---|
| 6,374,112 B1 * | 4/2002 | Widegren et al. | 455/452.2 |
| 6,393,277 B1 * | 5/2002 | Sahin et al. | 455/423 |
| 6,393,290 B1 * | 5/2002 | Ufongene | 455/446 |
| 6,434,380 B1 * | 8/2002 | Andersson et al. | 455/406 |
| 6,498,934 B1 * | 12/2002 | Muller | 455/450 |
| 6,549,785 B1 * | 4/2003 | Agin | 455/522 |
| 6,553,006 B1 * | 4/2003 | Kalliokulju et al. | 370/310 |
| 6,646,995 B1 * | 11/2003 | Le Strat et al. | 370/252 |
| 6,658,257 B1 * | 12/2003 | Hirayama et al. | 455/451 |
| 6,718,233 B2 * | 4/2004 | Sakhitab et al. | 700/259 |
| 6,748,220 B1 * | 6/2004 | Chow et al. | 455/450 |
| 6,889,050 B1 * | 5/2005 | Willars et al. | 455/452.2 |
| 2003/0133409 A1 * | 7/2003 | Corazza | 370/230 |
| 2003/0186653 A1 * | 10/2003 | Mohebbi et al. | 455/67.11 |
| 2003/0193907 A1 * | 10/2003 | Rezaiifar et al. | 370/329 |

FOREIGN PATENT DOCUMENTS

| | | |
|---|---|---|
| JP | 09-139712 | 5/1997 |
| WO | WO 93/09626 | 5/1993 |
| WO | WO 98/24198 | 6/1998 |
| WO | WO 98/24199 | 6/1998 |
| WO | WO 01/52425 A2 | 7/2001 |

* cited by examiner

RADIO RESOURCE MANAGEMENT IN A COMMUNICATION SYSTEM

PRIORITY CLAIM

This is a U.S. national stage of PCT application No. PCT/EP01/00568, filed on Jan. 18, 2001. Priority is claimed on that application and on patent application No. 0003369.6 filed in Great Britain on Feb. 14, 2000.

FIELD OF THE INVENTION

The present invention relates to radio resource management in a telecommunications system, and in particular, but not exclusively, to radio resource management in a multiple access telecommunications system.

BACKGROUND OF THE INVENTION

A number of different radio telecommunication systems are known. A radio telecommunications system provides mobility for the mobile stations, i.e. the mobile stations are typically enabled to move from a location to another. A mobile station may also roam from one network to another network, if the other network is compatible with the standard the given mobile station is adapted to and there is a roaming agreement between the operators of the two networks. A radio telecommunications network is a cellular network consisting of cells. The cell can be defined as a service area covered by one or several base transceiver stations (BTS) serving mobile stations (MS) or similar user equipment (UE) via a radio interface. Examples of the multiple access cellular radio networks include CDMA (Code Division Multiple Access) or WCDMA (Wide-band CDMA) or TDMA (Time Division Multiple Access) system or FDMA (Frequency Division Multiple Access) systems and hybrids thereof.

The radio network system is typically provided with radio resource management function that may be based on the received noise raise of the received radio signal. A function of the radio resource management is to continuously adjust the transmission power levels between a base (transceiver) station (BS) and a mobile station (MS) associated with said base station during an ongoing connection between the base station and the mobile station. This is done in order to provide a sufficient quality for the transmission in various conditions. To reduce power consumption and interference it is also preferred to keep the required transmission power levels as low as possible at the same time. By means of this it is possible to avoid "wasting" network resources and power resources, and to enable as great a number of mobile stations as possible to communicate simultaneously with the base station having only limited power resources. The power resources of the base station may be limited both in transmission (downlink) and receiving (uplink) directions.

One power control mechanism is based on power control (PC) commands transmitted between two stations to cause the other station to alter or adjust or change its transmission power. The PC commands can be transmitted e.g. in a WCDMA closed loop functioning between the base station and the mobile station. The closed loop PC (CLPC) commands can be sent both in the uplink (towards the base station) and in the downlink (towards the mobile station), whereafter the base station or the mobile station will process the received command and reduce/increase its transmission power accordingly. The power control between the stations, such as the closed loop PC, may be controlled by another power control command generated by a controller of the communication system. For example, in the currently proposed WCDMA system it is envisaged that an outer loop power control (OLPC) command generated by a radio network controller (RNC) of the WCDMA system will attempt to set the connection quality target of a physical connection between the base station BS and the mobile station MS to be such that a required FER (Frame Error Ratio) target or BER (Bit Error Ratio) target or any other similar target of the connection is met with a minimal connection quality target. The closed loop power control command is then adjusted at the base station in accordance with the outer loop power control command received from the controller. The connection quality target may sometimes be referred to as a connection setpoint.

The connection quality target or setpoint can be announced e.g. by means of so called Eb/No (Signal Energy/Noise) target or SIR (Signal to Interference Ratio) target or desired signal level target or a similar parameter indicating a quality measure which can be estimated for the connection. The relationship between the parameters is such that the connection quality target (e.g. the SIR target) has to be set such that the FER or the BER or similar parameter of the connection remains at an appropriate level. The actual connection quality value (e.g. SIR) is then controlled in accordance with the target value, and one or several of used connection parameters having influence to the quality of the connection should follow any changes in the target value. In most cases it is sufficient if the transmission power is increased/decreased in order to meet the target value. The idea behind the arrangement is that by increasing the connection quality target value the transmission power (or any other appropriate transmission parameter having an influence over the connection quality) will increase and thus the connection quality will increase and the FER will improve.

When more than one radio station communicate within a certain area, the radio stations may interfere each others radio connection. A form of this interference problem is known as adjacent channel interference (ACI). The interfering stations may be in communication with the network apparatus of the same network system and operator. The interfering mobile stations may also be in communication with different radio networks operated by different operators. The interfering networks may even be based on a different standards and/or principles of operation.

Although it may be possible to ease the problem caused by the simultaneous radio traffic between several stations by careful network planning, the amount and nature of interference caused by radio apparatus of other network systems is very difficult to predict and/or take into account beforehand. Despite the careful network planning, adjacent channel interference caused by radio stations of the same system may still occur e.g. due to increase in the radio traffic and/or in the number of users roaming within a cell of the radio network.

A specific problem with the adjacent channel interference may occur when an interfering mobile station comes close to a base station, especially when the uplink transmission power of the interfering mobile station is relatively high compared to the other mobile stations. Uplink received power can be filtered by various filter means and thereby it may be possible to reduce the effect of short time or narrowband interference. However this may prove to be difficult to accomplish and does not totally solve the interference problem. Although filter means may be employed in order to minimise and/or normalise the problems caused by the interfering mobile radio station, the filter means have only a limited adjacent channel interference protection, and the interfering station may still block useful signals from the other stations.

Additional or unexpected interference in the uplink direction may influence adversely the radio resource management, since the radio resource management is based on the relative received power in the uplink. In the uplink the noise raise relative to noise floor (i.e. the basic noise of the system) is determined, and this should not exceed a predefined target (for example, 6 dB).

The noise raise describes the ratio of the total interference power and the noise power in the dB-scale. The noise raise can be calculated as follows:

$$\text{Noise\_raise} = \frac{\text{Interference} + \text{Noise}}{\text{Noise}} \text{ in linear scale and} \quad (1), (2)$$

$$\text{Noise\_raise} = 10 \cdot \log_{10}\left(\frac{\text{Interference} + \text{Noise}}{\text{Noise}}\right) \text{dB in dB-scale}$$

The noise floor is denoted by the Noise-term in above equations (1) and (2). Noise floor typically contains the thermal noise, noise figure and other noises, which are not in the interference. The noise raise value can be measured by a base station e.g. by subtracting the noise floor from the avarage total received power.

The additional interference may change the assumptions made during the network planning so that the noise floor is no longer constant, but may become increased. As a consequence to this, some network capacity may be lost because of the interference. The interference problem may last only for short periods of time, and the occurrence of interference is hard to predict. Therefore the various interference instances may generate different kinds of unexpected fluctuations into the network. The interference may also cause a station to be dropped from the cell. The station's sensitivity to drop from the cell depends on uplink and/or downlink powers. In addition, the pure interference based load control, admission control and packet scheduler algorithms may not always be applicable for all radio environments (e.g. in micro or pico cells). Therefore it may be advantageous to base the management of the uplink load on some other factor. The other factor should be selected such that it is less sensitive for the adjacent channel interference (ACI) problem than the above described solutions. In the event of a strong adjacent channel interference (ACI), the conventional interference based radio resource management may clear/drop even the whole cell because of one interfering station that causes the adjacent channel interference into that cell.

SUMMARY OF THE INVENTION

It is an aim of the embodiments of the present invention to address one or several of the above problems.

According to one aspect of the present invention, there is provided a method in a radio communication system, the method comprising allocating a bitrate for a station of the radio communication system, and managing radio resources of the system based on information of the allocated bitrate.

According to another aspect of the present invention there is provided a radio communication system comprising means for allocating bitrates for stations of the radio communication system and means for managing radio resources of the system based on information of the allocated bitrates.

The embodiments of the invention may provide a radio resource management arrangement in which the presence of interference, such as adjacent channel interference, may cause less capacity loss than in the conventional power based radio resource management. The embodiments may also improve the quality of service experienced by the stations when compared to the power based solutions. The embodiments also provide information of the that may be used in defining the source of the interference and/or when making decisions as to how to handle the detected interference situation.

BRIEF DESCRIPTION OF DRAWINGS

For better understanding of the present invention, reference will now be made by way of example to the accompanying drawings in which.

DESCRIPTION OF PREFERRED EMBODIMENTS OF THE INVENTION

Figure 1:
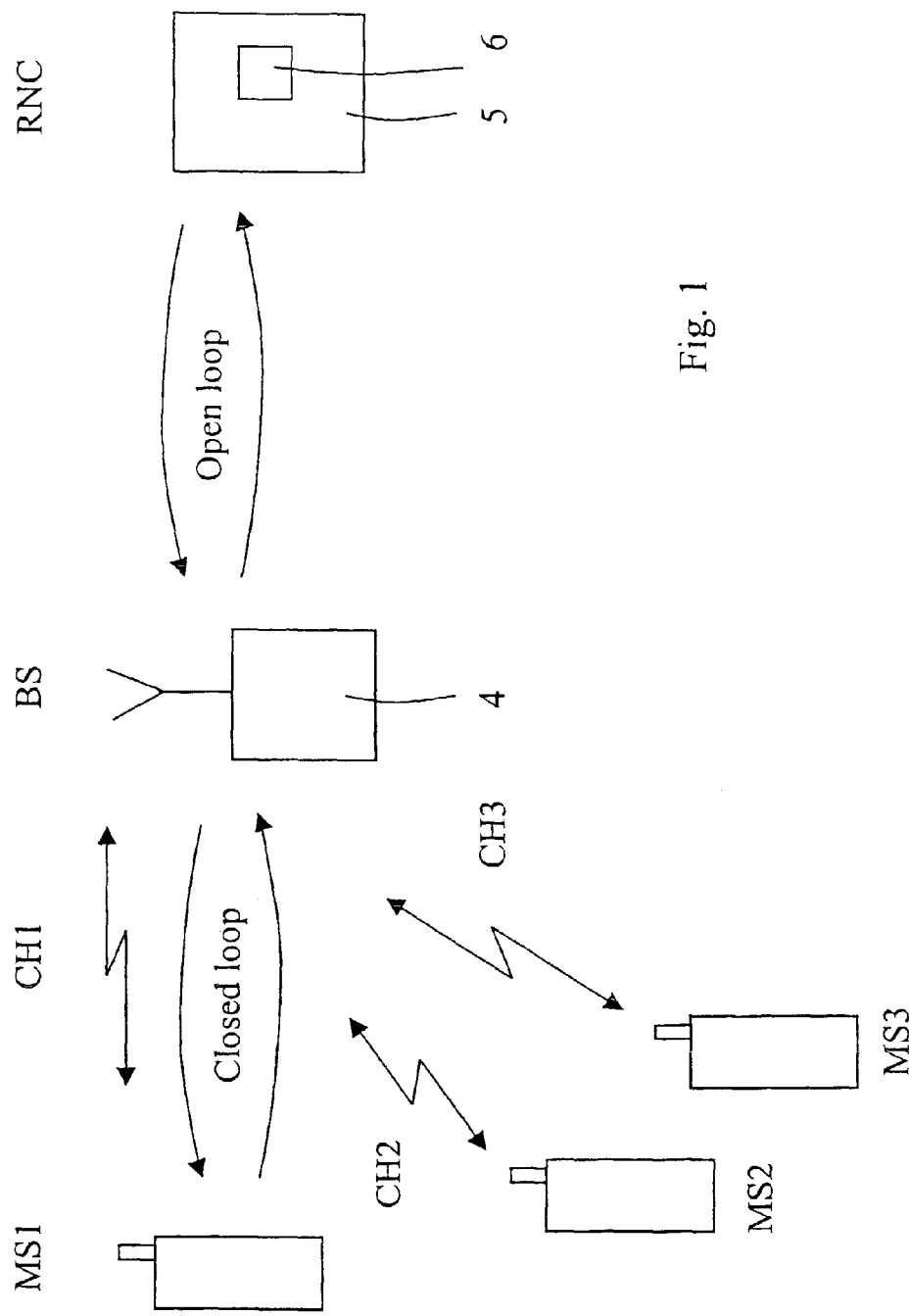
FIG. 1 shows schematically a part of a communication system in which the invention can be implemented.
Figure 2:
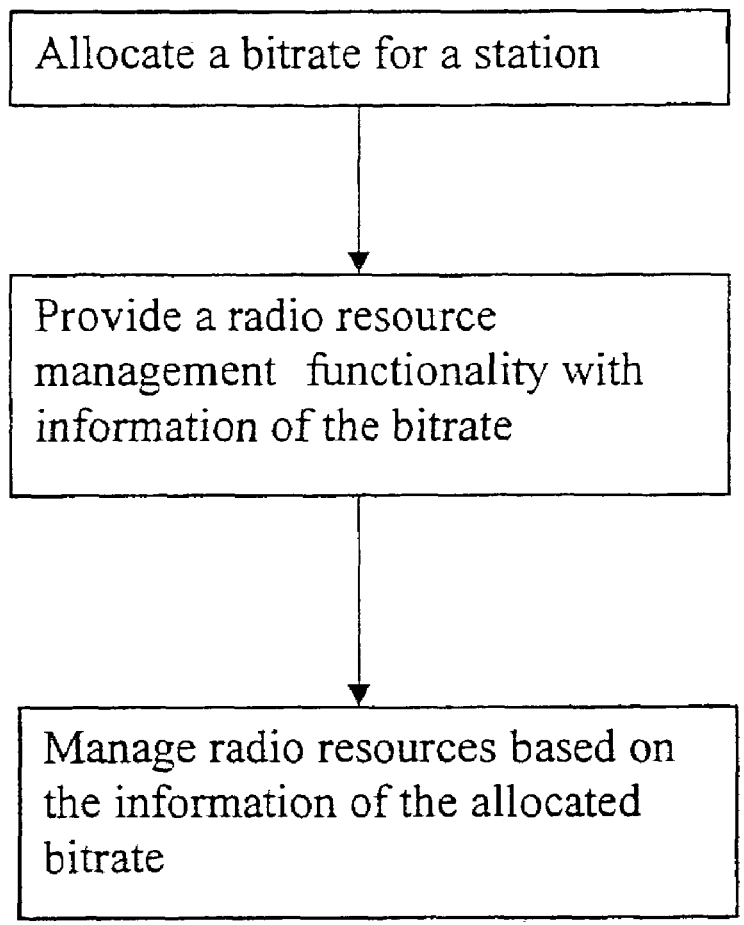
FIG. 2 is a flowchart illustrating the operation of one embodiment of the present invention.

Reference is first made to FIG. 1 which is a block diagram illustrating a context in which the present invention may be used. That is, a WCDMA system (Wideband CDMA) mobile communication system allows a plurality of mobile stations MS1, MS2, MS3 to communicate with a base transceiver station (BS) 4 in a common cell over a radio interface via respective channels CH1, CH2, CH3. The base station can sometimes be referred to as node B. In the CDMA based systems these channels are distinguished from one another by the use of scrambling codes in a manner which is known by the skilled person.

WCDMA may have two operational modes, namely frequency division duplex (FDD) mode and time division duplex (TDD) mode. In the FDD mode the uplink and the downlink are transmitted in different frequencies. In the TDD mode they are transmitted in the same frequency, but divided in time. 15 timeslots may be used in the TDD mode. From these a part can be used for uplink and the rest for downlink. The following description relates to the use of the FDD mode, although the embodiments of the invention may be used in both modes of the WCDMA.

Communication between the mobile stations 1-3 and the base station 4 may comprise any kind of data such as speech data, video data or other data. The data may be transmitted as a plurality of data symbols in subsequent data or radio frames. The signals carrying the data may be transmitted with variable data symbol transmission rates (data speeds), wherein the transmission rate may be different in subsequent frames of the transmission. For example, in the cellular CDMA (Code Division Multiple Access) system data is encoded for transmission by processing data symbols to be transmitted by a spreading code for each transmission channel. The effect of a spreading code is to spread the frequency band of a transmission to a chip rate which is larger than the actual data or information symbol rate. This results that more symbols is transmitted than what the actual number of information symbols is since at least some of the symbols are repeated. For example, if the used spreading factor is eight, eighth symbols (referred to as "chips") are transmitted for every information symbol.

The base station 4 is controlled by a controller 5 of the communication system. In the CDMA terminology this controller is often referred to as a radio network controller (RNC). The general arrangement is typically such that while the base station 4 controls the individual mobile stations 1-3 in its radio coverage area via the radio channels, the network controller 5 may function as a "central" controller controlling several base stations. The mobile stations MS1-MS3 may be controlled by the controller 5 through the base station 4. The power control commands between the mobile stations and the base station are handled by a closed loop power control mechanism.

In the currently proposed WCDMA system the base station 4 receives appropriate control commands from the controller 5 via an outer loop (OL) power control (PC) mechanism. As response to the received commands the base station 4 proceeds accordingly to control the connections with individual mobile stations MS1-MS3 via the closed loop (CL) between the respective mobile station and the base station. According to one possibility the commands may be transmitted in the closed loop in the frequency of 1.5 kHz, and in the outer loop in the frequency of about 10 to 100 Hz. However, it is noted that any other frequencies may be used here.

The transmitting and receiving resources of radio communication system are managed by a radio resource management functionality. The radio resource management (RRM) may contain functions such as power control, handover control, admission control, load control, packet scheduler and resource manager. In FIG. 1 a radio resource management unit 6 is implemented within the radio network controller 5. However, the resource management function may also be implemented in another appropriate network element, such as it the base station or within a mobile switching centre. The resource management function may also be distributed over several elements. For example, a portion of the functionality could be handled at the radio network controller 5 and another portion of the functionality could be handled at the base station 4. The following description of the exemplifying embodiments will concentrate in more detail on a radio resource management that is implemented at the radio network controller.

The embodiments of the invention are based on the realisation that the radio resource management RRM may be based also on other factors than on the received noise raise. The management may be based on a measure that is derived from a user bitrate. Examples of the appropriate basic information derived from a user bitrate include clear bitrate, a cell load factor that is weighted by an appropriate noise ratio (such as Eb/No), or a measure that is derived by weighing the user bitrate by signal-to-interference ratio (SIR).

The bitrate based embodiments are capable of defining the uplink load in a relatively accurate manner. Since the users of the cell (i.e. stations within the cell) are known, embodiments of the bitrate based method may be able to indicate the source of the interference. If the interference is determined to be caused by a user of the same cell, it is possible for the radio resource management to more accurately adjust the power levels of the interfering station or stations that suffer from the interference.

The cell load factor (L) for a station may be calculated, for example, by equation:

$$L = \frac{1}{1 + \frac{Chiprate}{EbN0 * Bitrate}} \quad (3)$$

or $$L = \frac{1}{1 + \frac{Chiprate}{EbN0 * Bitrate * activity}} \quad (4)$$

In equation (4) the activity means e.g. voice activity, which is typically modelled to be 0.67 in the WCDMA in the case of a voice/speech user.

In (3) the chiprate of the user is given by the system (for example, in the WCDMA proposals the chiprate is 3.84 Mchip/s). The Eb/No value is the signal energy/noise ratio of the connection. The Eb/No is either measured for the connection or obtained otherwise, as will be explained below. The user bitrate is a value that may obtained from the controller RNC or alternatively from the base station BS. Exemplifying user bitrate values are such as 1024, 512, 256, 128, 64, 32 and 16 kbps (kilobits per second). In the WCDMA the user bitrate can be any value below 2 Mbit/s. The bitrate may be set by the RNC.

The measure L provided by the equation (3) can be used when providing a target value for the powers in the radio resource management (RRM). The uplink own cell load factor L may be used as uplink load indicator, i.e. it determines the uplink load of the own cell. For example, if the uplink own cell load is said to be 60% of the WCDMA pole capacity, it means that the load factor L=0.60. However, the L considers only the load caused by the own cell users. As will be discussed in more detail later, the actual total uplink load $\eta$ is (1+i)*L, wherein i designates the other to own cell interference ratio. If the uplink total load factor $\eta$=0.60, the uplink load is 60% of the WCDMA pole capacity. The uplink total load factor $\eta$, which is also sometimes called fractional load, can be calculated as follows:

$$Noise\_raise = \frac{1}{1-\eta} \text{ in linear scale} \Leftrightarrow \eta = 1 - \frac{1}{Noise\_raise} \text{ in linear scale} \quad (5)$$

According to a possibility the results of the bitrate based computations are combined with the results of a power based approach.

If the air interface load is allowed to increase too much, the coverage area of the cell may be reduced below the planned values, and the quality of service of the existing connections cannot be guaranteed. Admission control function of the radio resource management accepts or rejects a request to establish a radio access bearer in the radio access network. Before admitting a new connection, the admission control may check that the admittance of a new user will not affect disadvantageously the planned coverage area or the quality of the existing connections. The threshold values for the admission control are preferably set by the radio network planning.

If the measure L obtained by equation (3) is used as a target in the radio resource management, for example, during the admission control procedure the user would be admitted to access the cell if:

L_Total<L_Target

In the latter case the appropriate parameters for the radio resource management are based both on the noise raise information and the bitrate information. Thus, in the combined solution the user would be admitted to enter if:

(L_Total<L_Target AND PrxTotal<PrxTarget)

The target values are preferably set at the network planning stage. It may be useful to set the L_Target value so that in normal operation the target value leads to a lower PrxTotal than what the PrxTarget is. By means of this, it is possible to arrange the operation of the system to be such that it is only in presence of an ACI (or similar interference) when the power target can be reached. In practice this may mean that the PrxTarget is set so that in a normal operation the PrxTotal reaches it before the L_Total reaches the set L_Target. But with exceptional high interference (like ACI) the PrxTotal is already without any load close or above the set PrxTarget. In this case the operation is based on the L_Total, which is not effected by interference.

L_Total value can be calculated by the controller RNC or by the base station. According to a possibility the Eb/NO in equation (3) is measured by the base station. The Eb/No may alternatively constitute of an outer-loop Eb/NO that is known by the RNC or of a planned_Eb/NO that is also known by the RNC. However, it is noted that the quality parameter may be different from the Eb/No value and that it may be obtained by other means as well. Possibilities include use of a user SIR or the transmitted power of the mobile station MS.

It may also be advantageous to tune the radio resource management RRM cell-by-cell basis. By means of this the radio resource management can be made more adjacent channel interference (ACI) preventive in instances where the ACI is a relatively severe problem. Correspondingly, when the ACI does not constitute a relatively severe problem, the radio resource management may be made less effective against the ACI. In general, the ACI problems are more probable in micro/indoor cells than in macro cells.

The following will discuss some examples for the computations of various parameters that may be used when implementing the embodiments of the invention.

According to a preferred embodiment the load factor L is computed for all stations within a cell. The individual load factors are summed in order to obtain a total load, i.e. the uplink load factor is calculated as a sum of the load factors of the users which are connected to the base station of the cell. The sum of the connection based load factors for a cell may thus be presented (cf. equation 3):

$$L = \sum_{i=1}^{M} \frac{1}{1 + \frac{W}{\rho_i R_i}} \quad (6)$$

wherein
M is the total number of own cell active stations
W is the chip rate
$R_i$ is the bit rate of the $i^{th}$ own cell user
$\rho_i$ is the Eb/No of the $i^{th}$ own cell user If the real-time (RT; circuit switched connections, such as speech and real-time video connections) users and the not real-time (NRT; packet switched connections, such as web-browsing, email or voice over IP connections) users are separated, the computations would then be:

$$L_{RT} = \sum_{i=1}^{M_{RT}} \frac{1}{1 + \frac{W}{\rho_i R_i}} \quad (7)$$

and $$L_{NRT} = \sum_{i=1}^{M_{NRT}} \frac{1}{1 + \frac{W}{\rho_i R_i}} \quad (8)$$

Equations (7) and (8) may then be summed together and thus the total L-factor is:

$$L + L_{RT} + L_{NRT} \quad (9)$$

The L value obtained by equation (6) or (9) may be used directly in the radio resource management as was proposed above by definition (4) instead of using a fractional load η as in the conventional approaches. (Fractional load=(noise raise)/(noise power)). In other words, as long as L_Total that is computed by (6) or (9) is smaller than a predefined L_Target value, the radio resource management may increase the powers in the cell.

If the radio resource management is based on the combined solution (i.e. L_Total<L_Target AND PrxTotal<PrxTarget as defined by (5)), a Power Increase Estimation (PIE) method in the uplink may be defined as follows (10):

$$\Delta P_{rx\_total} = P_{rx\_total.new} - P_{rx\_total.old} \Leftrightarrow \quad (10)$$

$$\Delta P_{rx\_total} = \left( \sum_{i=1}^{M} \frac{1}{1 + \frac{W}{\rho_i R_i}} i \right) P_{rx\_total.old} +$$

$$\left( \sum_{i=1}^{M} \frac{1}{1 + \frac{W}{\rho_i R_i}} + \Delta L \right)(P_{rx\_total.old} + \Delta P_{rx\_total}) + P_N - \sum_{i=1}^{M} \frac{1}{1 + \frac{W}{\rho_i R_i}}(1+i)P_{rx\_total.old} - P_N \Leftrightarrow$$

$$P_{rx\_total} = LiP_{rx\_total.old} + (L + \Delta L)(P_{rx\_total.old} + \Delta P_{rx\_total}) - L(1+i)P_{rx\_total.old} \Leftrightarrow$$

$$\Delta P_{rx\_total} = L(1+i)P_{rx\_total.old} + L\Delta P_{rx\_total} + \Delta L(P_{rx\_total.old} + \Delta P_{rx\_total}) - L(1+i)P_{rx\_total.old} \Leftrightarrow$$

$$\Delta P_{rx\_total} = L\Delta P_{rx\_total} + \Delta L(P_{rx\_total.old} + \Delta P_{rx\_total}) \Leftrightarrow$$

$$\Delta P_{rx\_total} = \frac{\Delta L}{1 - L - \Delta L} P_{rx\_total.old}$$

Instead of a computational value L, the own cell load factor L (equation 6) may be measured at the base station and signalled to RNC at appropriate intervals, e.g. at every 100 ms. It is also possible to calculate L in the RNC by using the Eb/No-setpoint value instead of the measured Eb/No's from the base station. In that case the bit rates may be obtained from a MAC (Medium Access Control) layer.

It may also be necessary to take discontinuous transmission conditions (DTX) into account.

The advantage of the L-factor based approach is that it may not be especially sensible to Adjacent Channel Interference (ACI) and/or to the changes of system noise (PrxNoise).

If the baseline noise (i.e. system noise) varies a lot and the whole fractional load η based approach is not wanted to be used, it is possible to forget the fractional load and measure the UL load only based on equation (6).

The UL load threshold may be given by:

PrxTarget:

$$\frac{P_{rx\_target}}{P_{rx\_noise}} = \frac{1}{1 - L_{target}} \qquad (11)$$

PrxTargetBS=PrxTarget+PrxOffset $$\frac{P_{rx\_target\_BS}}{P_{rx\_noise}} = \frac{1}{1 - L_{target} - L_{offset}} \qquad (12)$$

PrxThreshold:

$$\frac{P_{rx\_threshold}}{P_{rx\_noise}} = \frac{1}{1 - L_{threshold}} \qquad (13)$$

If, for example, the above PrxTarget/PrxNoise=2, then PrxTarget_dBm−PrxNoise_dBm=3 dB, which means that the target load is 3 dB over the noise level. On the other hand, this means 50% loading (i.e. fractional load 50%=>own cell load factor L is fractional load η=0.5 divided by i, wherein i=other-to-own cell interference ratio, which typically is order of 0.5).

So it is possible to give the load thresholds as load factors LTarget, LTargetBS and LThreshold. Because it is possible to ignore the interference from the other cells in the L-factor formula (6), the load threshold should be chosen to be smaller than the respective fractional load thresholds in the conventional approach. This is so because the i parameter (other-to-own cell interference ratio) is not taken into account. If parameter i is taken into account, as will be explained later, the total value for the interference may then be slightly higher. To be sure that the allowable threshold is not exceeded, it is preferred to set the L-threshold to have a slightly smaller value in applications where the interference caused by other cells in not taken into account.

PrxTarget:

$$\eta_{target} = 1 - \frac{1}{P_{rx\_target} / P_{rx\_noise}} \qquad (14)$$

PrxTargetBS=PrxTarget+PrxOffset:

$$\eta_{targetBS} = 1 - \frac{1}{P_{rx\_target\_BS} / P_{rx\_noise}} \qquad (15)$$

PrxThreshold:

$$\eta_{threshold} = 1 - \frac{1}{P_{rx\_threshold} / P_{rx\_noise}} \qquad (16)$$

Exemplifying values for LTarget, LTargetBS and Lthreshold may be: LTarget=0.35, LTargetBS=0.4 and Lthreshold=0.5. The fractional load values are typically at least 1.5 times higher.

The above equations ignore the changes in the interference of the other cells when the own cell interference changes. However, as will be explained below in more detail, the interference caused by other cells may also be taken account by means of an appropriate parameter i.

Measured fractional load may contains both load from the own cell and load from other cells. In other words:

the fractional_load=load_factor_own+load_factor_other=(1+i)*load_factor_own, (17)

wherein i=other-to-own cell interference ratio.

In the uplink (UL) direction, a fractional load η can be defined as follows:

$$\eta = L(1+i) = (1+i)\sum_{j=1}^{M} L_j = (1+i)\sum_{j=1}^{M} \frac{1}{1 + \frac{W}{\rho_j R_j}} \Leftrightarrow \qquad (18)$$

$$\eta = \frac{P_{rx\_oth} + P_{rx\_own}}{P_{rx\_total}} = \frac{P_{rx\_own}}{P_{rx\_total}}(1+i) = L(1+i)$$

where
η is the fractional load
L is the load factor of the pure own cell users
i is the other-to-own cell interference ratio.
$P_{rx\_oth}$ is the interference power of the other cells
$P_{rx\_own}$ is the interference power of the own cell
M is the total number of own cell active users
W is the chip rate
$R_j$ is the bit rate of the $j^{th}$ own cell user
$\rho_j$ is the Eb/No of the $j^{th}$ own cell user
If i=0, then only own cell interference is taken into account.
It is possible calculate the i value as follows:

$$i = \frac{P_{rx\_oth}}{P_{rx\_own}} \Leftrightarrow \qquad (19)$$

$$i = \frac{P_{rx\_total} - P_{rx\_own} - P_{rx\_noise}}{P_{rx\_own}} \Leftrightarrow$$

$$i = \frac{P_{rx\_total} - LP_{rx\_total} - P_{rx\_noise}}{LP_{rx\_total}}$$

The fractional load η can be defined and calculated simply as follows:

$$\eta = \frac{P_{rx\_oth} + P_{rx\_own}}{P_{rx\_total}} = \qquad (20)$$

$$\frac{P_{rx\_total} - P_{rx\_noise}}{P_{rx\_total}} = 1 - \frac{P_{rx\_noise}}{P_{rx\_total}} = 1 - \frac{1}{NR}$$

where $P_{rx\_noise}$ is the system noise spectral density when there is no WCDMA-traffic (=thermal noise spectral density+ noise value measured in BS)

$P_{rx\_total}$ is the total interference plus noise spectral density

NR is the noise raise (usually given in dBs (dBs over noise)).

The following is an example of the criteria when the radio resource management may start dropping real time users from the cell:

$$\begin{cases} (1) \; P_{rx\_total} > P_{rx\_threshold} \; \text{AND} \\ (2) \; L_{total} = \sum_{i=1}^{No\_users} \frac{1}{1 + \frac{W}{R_i \cdot Eb/No_i}} > L_{threshold} \; \text{AND} \\ (3) \; \frac{1}{DropWaitingTime} \sum_{j=1}^{DropWaitingTime} P_{rx\_total\_j} > P_{rx\_threshold} \end{cases} \qquad (21)$$

If the condition defined by (21) is met, the radio resource management has to start to drop users from the cell.

In a L-factor based radio resource management the presence of an interference, such as the ACI referred to above, causes less capacity loss than what it would cause in a solely power based radio resource management. For example, when the ACI tends to cause a problem, the L-factor based radio resource management tries to keep the bitrates by increasing powers. Because the ACI is more likely a problem in one cell at a certain time instance than a simultaneous problem in several cells, the extra interference caused to the neighboring cells may be found to be in a tolerable level.

Generally speaking, it may be said that the L-factor based radio resource management of the above discussed embodiments may provide a better user QoS (Quality of service) than the conventional power based radio resource management in the presence of external interference (like the ACI). In addition, pure interference based load control, admission control and packet scheduler algorithms might not be applicable for all kinds of radio environments. Therefore it may be advantageous to manage the uplink load based on the load factor (L_total), as the load factor may be less sensitive for the ACI problem.

It should be appreciated that whilst embodiments of the present invention have been described in relation to mobile stations, embodiments of the present invention are applicable to any other suitable type of user equipment.

The embodiment of the present invention has been described in the context of a WCDMA system. This invention is also applicable to any other access techniques including frequency division multiple access or time division multiple access as well as any hybrids thereof. It should also be appreciated that the term cell is intended to cover also a group of cells, where applicable.

It is also noted that the invention is applicable in both the FDD and TDD modes of the WCDMA. The above description relates to the FDD mode. However, it is also possible to calculate the uplink load for each timeslot separately.

It is also noted herein that while the above describes exemplifying embodiments of the invention, there are several variations and modifications which may be made to the disclosed solution without departing from the scope of the present invention as defined in the appended claims.

What is claimed is:

1. A method comprising:
   allocating a bitrate for a station of the radio communication system; and
   managing radio resources of the system based on information of the allocated bitrate;
   wherein the information comprises a load factor which indicates the uplink load of a cell, the load factor being determined based on the allocated bitrate and signal energy to noise ratio in an uplink signal, and the load factor is independent of a ratio of uplink interference from said cell to uplink interference from other cells, the load factor being defined by taking an inverse of equation:

1+[(chiprate×noise)/(signal energy×bitrate)].

2. The method of claim 1, wherein the load factor is measured by a base station of the radio communication system.

3. The method of claim 1, wherein a load factor is determined for all stations within a cell of the radio communication system.

4. The method of claim 3, wherein load factors of all stations in the cell are summed together to receive a total load factor of the cell.

5. The method of claim 4, wherein a target load is set for the total load factor.

6. The method of claim 1, further comprising a step of identifying a station that causes interference to the radio communication system.

7. The method of claim 6, wherein the interference consists of adjacent channel interference.

8. The method of claim 6, wherein a power of an interfering station is adjusted.

9. The method of claim 8, wherein uplink power of the interfering station is adjusted.

10. The method, of claim 6, wherein powers of the stations that suffer from the interference by the interfering station are adjusted.

11. The method of claim 1, wherein the management of radio resources is also based on a total power value that is derived from noise ratio information.

12. The method of claim 11, wherein a power target value is set for the total power value.

13. The method of claim 1, wherein the determination of the load factor is accomplished at a base station.

14. The method of claim 1, wherein the determination of the load factor is accomplished at a radio network controller.

15. The method of claim 1, wherein the management of the radio resources is adapted in a cell-by cell basis.

16. The method of claim 1, wherein the load factor is also based on information of interference caused by other cells.

17. The method of claim 1, wherein the management of the radio resources is accomplished at a radio network controller and the load factor is signalled from a base station of a radio network controller with predefined intervals.

18. A radio communication system, said system configured to:
   allocate bitrates for stations of the radio communication system; and
   manage radio resources of the system based on information of the allocated bitrate;

wherein the information comprises a load factor which indicates the uplink load of a cell, the load factor being determined based on the allocated bitrates and signal to noise ratio in an uplink signal, and the load factor is independent of a ratio of uplink interference from said cell to uplink interference from other cells, the load factor being defined by taking an inverse of equation:

$1+[(\text{chiprate} \times \text{noise}) / (\text{signal energy} \times \text{bitrate})]$.

19. The radio communication system of claim 18, wherein a radio resource management unit is arranged to allocate the bitrates and to manage the radio resources.

20. A radio resource management unit, comprising:
means for allocating bitrates for stations of a radio communications system; and
means for managing radio resources of the system based on information of the allocated bitrates;
wherein the information comprises a load factor which indicates the uplink load of a cell, the load factor being determined based on the allocated bitrates and signal to noise ratio in an uplink signal, and the load factor is independent of a ratio of uplink interference from said cell to uplink interference from other cells, the load factor being defined by taking an inverse of equation:

$1+[(\text{chiprate} \times \text{noise})/(\text{signal energy} \times \text{bitrate})]$.

21. A method for operating a radio resource management unit, the method comprising:
allocating a bitrate for a station of a radio communications system; and
managing radio resources of the system based on information of the allocated bitrate;
wherein the information comprises a load factor which indicates the uplink load of a cell, the load factor being s determined based on the allocated bitrate and signal energy to noise ratio in an uplink signal, and the load factor is independent of a ratio of uplink interference from said cell to uplink interference from other cells, the load factor being defined by taking an inverse of equation:

$1+[(\text{chiprate} \times \text{noise})/(\text{signal energy} \times \text{bitrate})]$.

22. A processor for a radio resource management unit, comprising:
means for allocating bitrates for stations of a radio communications system; and
means for managing radio resources of the system based on information of the allocated bitrates;
wherein the information comprises a load factor which indicates the uplink load of a cell, the load factor being determined based on the allocated bitrates and signal to noise ratio in an uplink signal, and the load factor is independent of a ratio of uplink interference from said cell to uplink interference from other cells, the load factor being defined by taking an inverse of equation:

$1+[(\text{chiprate} \times \text{noise})/(\text{signal energy} \times \text{bitrate})]$.

23. A computer-readable medium, the computer readable-medium being encoded with a computer program, the computer program comprising:
program code for allocating a bitrate for a station of a radio communications system; and
program code for managing radio resources of the system based on information of the allocated bitrate;
wherein the information comprises a load factor which indicates the uplink load of a cell, the load factor being determined based on the allocated bitrate and signal energy to noise ratio in an uplink signal, and the load factor is independent of a ratio of uplink interference from said cell to uplink interference from other cells, the load factor being defined by taking an inverse of equation:

$1+[(\text{chiprate} \times \text{noise})/(\text{signal energy} \times \text{bitrate})]$.

24. A radio resource management unit configured to:
allocate bitrates for stations of a radio communications system; and
manage radio resources of the system based on information of the allocated bitrates;
wherein the information comprises a load factor which indicates the uplink load of a cell, the load factor being determined based on the allocated bitrates and signal to noise ratio in an uplink signal, and the load factor is independent of a ratio of uplink interference from said cell to uplink interference from other cells, the load factor being defined by taking an inverse of equation:

$1+[(\text{chiprate} \times \text{noise})/(\text{signal energy} \times \text{bitrate})]$.

25. The radio resource management unit of claim 24, wherein said management unit is provided in one of a base station and a radio network controller.

26. A processor for a radio resource management unit, said processor configured to:
allocate bitrates for stations of a radio communications system; and
manage radio resources of the system based on information of the allocated bitrates;
wherein the information comprises a load factor which indicates the uplink load of a cell, the load factor being determined based on the allocated bitrates and signal to noise ratio in an uplink signal, and the load factor is independent of a ratio of uplink interference from said cell to uplink interference from other cells, the load factor being defined by taking an inverse of equation:

$1+[(\text{chiprate} \times \text{noise})/(\text{signal energy} \times \text{bitrate})]$.

* * * * *